(12) United States Patent
Weng

(10) Patent No.: US 7,531,971 B2
(45) Date of Patent: May 12, 2009

(54) BACKLIGHT UNITS AND DISPLAY DEVICES

(75) Inventor: Chih-Hsun Weng, Taipei County (TW)

(73) Assignee: TPO Displays Corp., Miao-Li County (TW)

( * ) Notice: Subject to any disclaimer, the term of this patent is extended or adjusted under 35 U.S.C. 154(b) by 0 days.

(21) Appl. No.: 11/748,027

(22) Filed: May 14, 2007

(65) Prior Publication Data

US 2008/0284349 A1    Nov. 20, 2008

(51) Int. Cl.
*H05B 37/02* (2006.01)
(52) U.S. Cl. .................. 315/291; 315/224; 315/307; 345/102
(58) Field of Classification Search ............. 315/209 R, 315/224–226, 246–247, 291, 307–308, DIG. 4; 345/102, 204
See application file for complete search history.

(56) References Cited

U.S. PATENT DOCUMENTS

| | | | |
|---|---|---|---|
| 2005/0231127 A1* | 10/2005 | Yamamoto et al. ........... 315/224 |
| 2006/0255753 A1* | 11/2006 | Sawada et al. ............... 315/312 |
| 2007/0115248 A1* | 5/2007 | Roberts et al. ............... 345/102 |
| 2007/0182347 A1* | 8/2007 | Shteynberg et al. ......... 315/312 |
| 2007/0236154 A1* | 10/2007 | Lee .............................. 315/246 |
| 2007/0257645 A1* | 11/2007 | Nishino ....................... 323/276 |
| 2007/0268236 A1* | 11/2007 | Morrow ....................... 345/102 |
| 2007/0273681 A1* | 11/2007 | Mayell ........................ 345/211 |
| 2008/0074058 A1* | 3/2008 | Lee et al. ..................... 315/291 |
| 2008/0084196 A1* | 4/2008 | Lacombe et al. ............ 323/282 |
| 2008/0100224 A1* | 5/2008 | Felder et al. ................ 315/151 |

* cited by examiner

*Primary Examiner*—Douglas W Owens
*Assistant Examiner*—Tung X Le
(74) *Attorney, Agent, or Firm*—Thomas, Kayden, Horstemeyer & Risley

(57) ABSTRACT

A backlight unit comprising a boost circuit and a backlight element. The boost circuit is coupled to a voltage source and controlled by a PWM signal and a switch signal. When the backlight unit operates in a normal mode, the boost circuit is supplied by the voltage source according to the PWM signal and the switch signal to drive the backlight element to emit light. When the backlight unit operates in a standby mode, the voltage source stops supplying the boost circuit according to the PWM signal and the switch signal, and the backlight element stops emitting light.

12 Claims, 7 Drawing Sheets

BACKLIGHT UNITS AND DISPLAY DEVICES

BACKGROUND OF THE INVENTION

1. Field of the Invention

The invention relates to a backlight unit, and more particularly to a display device.

2. Description of the Related Art

FIG. 1 shows an application-specific integrated circuit (ASIC) and a backlight unit of a conventional display device. As shown in FIG. 1, a conventional display device 1 comprises an ASIC 10 and a backlight unit 11. The ASIC 10 comprises a voltage comparator 100 and a pulse width modulation (PWM) controller 101. The backlight unit 11 comprises a boost circuit 110 and two backlight elements 111 and 112. The boost circuit 110 comprises an inductor 110a, a transistor 110b, a diode 110c, a capacitor 110d, and a resistor 110e. When the backlight unit 11 is in a normal mode, a voltage source VCC, such as 3.3V, charges the inductor 110a according to a PWM signal S101 signal provided by the PWM controller 101 to raise a voltage value on a node N10, wherein the PWM signal S101 is alternately switched between a high logic state and a low logic state. The boost circuit 110 thus generates driving current Id1 according to the raised voltage value on the node N10. The backlight elements 111 and 112 are driven to emit light by the driving current Id1. It is assumed that the active voltage value of each backlight element is 2.6V-4V, wherein the backlight element emits low light at 2.6V and emits regular light at 3V-3.3V. Thus, the voltage value on a node N10 is raised to at least 6V for two backlight elements 111 and 112 to emit regular light. Moreover, the voltage comparator 100 detects a voltage value on a node N11 and compares the voltage value on a node N11 with a reference voltage value. The voltage comparator 100 generates a control signal S100 according to compared result. The PWM controller 101 receives the control signal S100 and modulates the pulse width of the PWM signal S101 according to the control signal S100.

When the backlight unit 11 is in a standby mode, the PWM signal S101 is in the low logic state for turning off the transistor 110b, and the voltage value on the node N10 is not raised sufficiently. The boost circuit 110 does not generate the appropriate driving current Id1, and the backlight elements 111 and 112 do not emit light.

Recently, a backlight unit capable of achieving brightness equivalent to two backlight elements using only one backlight element, as shown in FIG. 2. The backlight unit 11 comprises only one backlight element 111. As described above, the voltage source VCC provides 3.3V, and the active voltage value of the backlight element 111 is 2.6V-4V. When the backlight unit 11 is in a standby mode, the PWM signal S101 is in the low logic state for turning off the transistor 110b, and the voltage value on the node N10 is approximately equal to 3.3V, thus, the backlight element 11 can not stop emitting light or emit only a low light.

Thus, there are two solutions to the problem currently. As shown in FIGS. 3 and 4, in order to use only one backlight element, an additional resistor 30 or an additional diode 40, having a cross voltage value, replaces the backlight element 112. When the backlight unit 11 operates, however, the additional resistor 30 or the additional diode 40 induces additional power consumption.

A backlight unit of a display device with only one backlight element effectively turning off the backlight element and avoiding increased power consumption is desirable.

BRIEF SUMMARY OF THE INVENTION

The invention provides a backlight unit. An exemplary embodiment of a backlight unit comprises a boost circuit and a backlight element. The boost circuit is coupled to a voltage source and controlled by a pulse width modulation (PWM) signal and a switch signal. The boost circuit drives the backlight element. When the backlight unit operates in a normal mode, the boost circuit is supplied by the voltage source according to the PWM signal and the switch signal to drive the backlight element to emit light. When the backlight unit operates in a standby mode, the voltage source stops supplying the boost circuit according to the PWM signal and the switch signal, and the backlight element stops emitting light.

The invention provides a display device. An exemplary embodiment of a display device comprises an application-specific integrated circuit (ASIC) and a backlight unit. The ASIC provides a PWM signal and a switch signal. The backlight unit operates in a normal mode or a standby mode and is controlled by the PWM signal and the switch signal. The backlight unit comprises a boost circuit and a backlight element. The boost circuit is coupled to a voltage source and controlled by the PWM signal and the switch signal. When the backlight unit operates in the normal mode, the boost circuit is supplied by the voltage source according to the PWM signal and the switch signal, driving the backlight element to emit light. When the backlight unit operates, in the standby mode, the voltage source stops supplying the boost circuit according to the PWM signal and the switch signal, and the backlight element stops emitting light.

An exemplary embodiment of an electronic system is provided. The electronic system comprises an input unit and a display device. The input unit provides input signals. The display device is coupled to the input unit and displays images according to the input signals. The display device comprises an application-specific integrated circuit (ASIC) and a backlight unit. The ASIC provides a PWM signal and a switch signal. The backlight unit operates in a normal mode or a standby mode and is controlled by the PWM signal and the switch signal. The backlight unit comprises a boost circuit and a backlight element. The boost circuit is coupled to a voltage source and controlled by the PWM signal and the switch signal. The boost circuit drives the backlight element. When the backlight unit operates in a normal mode, the boost circuit is supplied by the voltage source according to the PWM signal and the switch signal to drive the backlight element to emit light. When the backlight unit operates in a standby mode, the voltage source stops supplying the boost circuit according to the PWM signal and the switch signal, and the backlight element stops emitting light.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
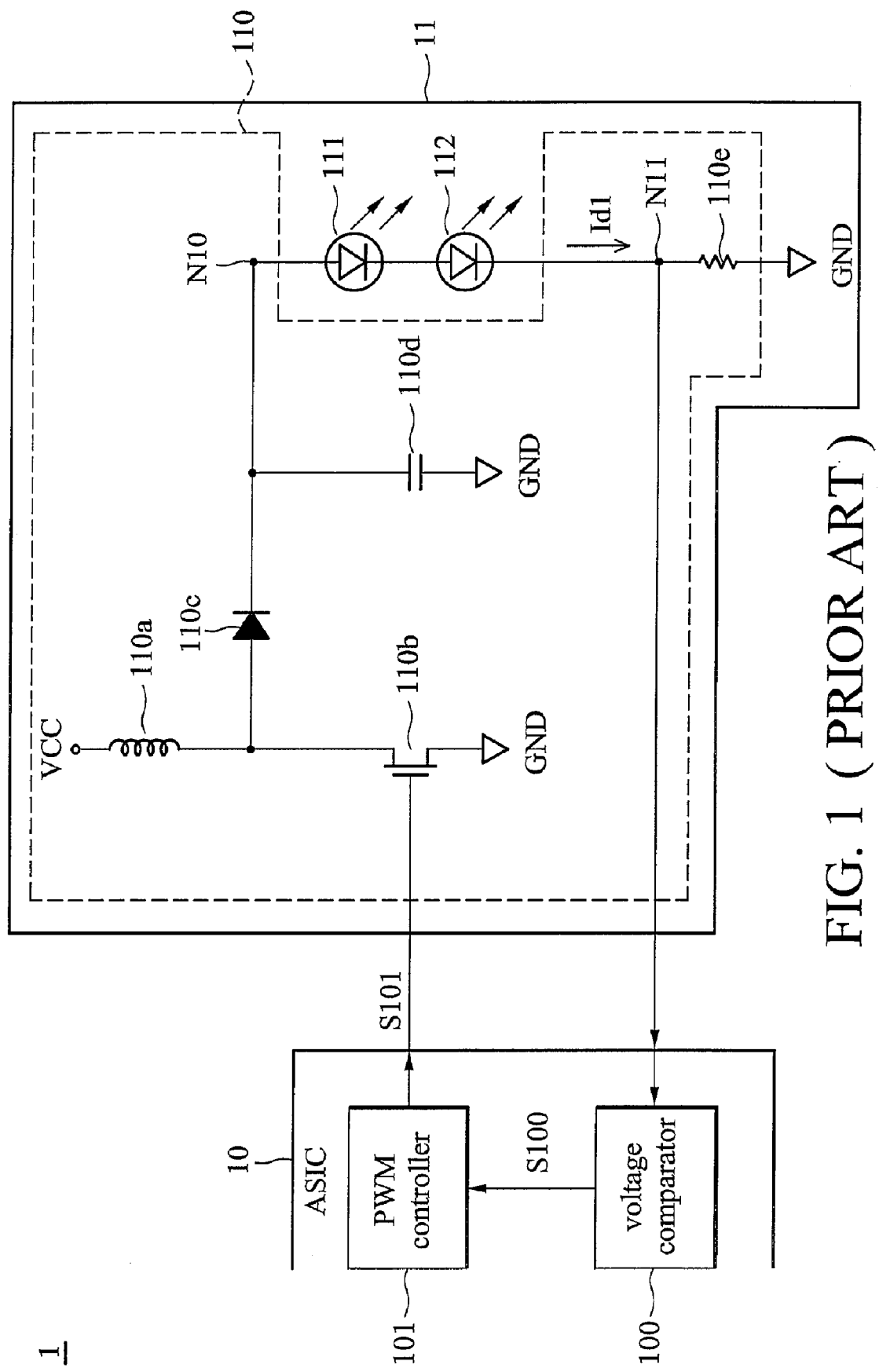
FIG. 1 shows a backlight unit of a conventional display device, wherein the backlight unit uses two backlight elements.
Figure 2:
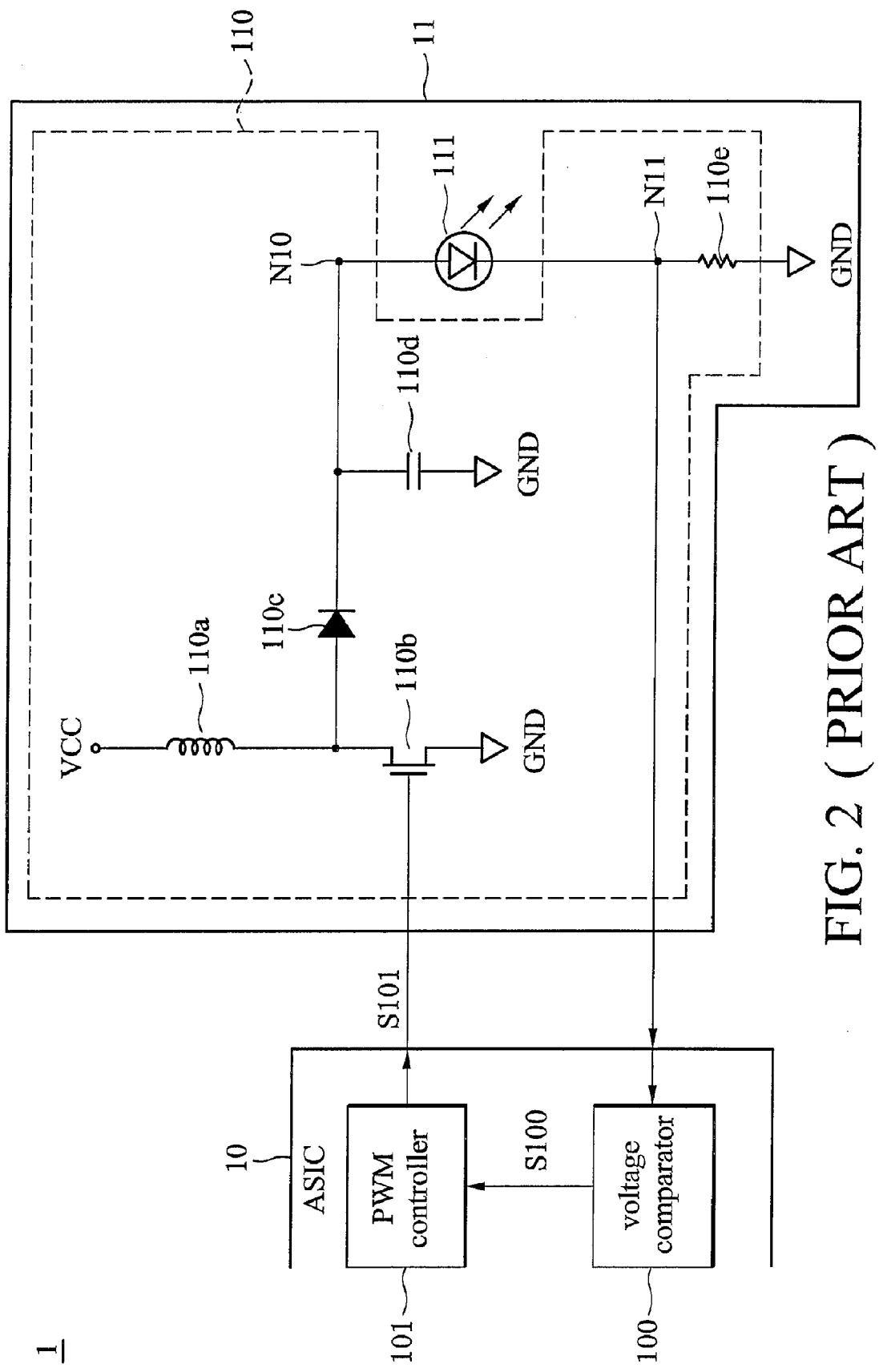
FIG. 2 shows a backlight unit of a conventional display device, wherein the backlight unit uses only one backlight element.
Figure 3:
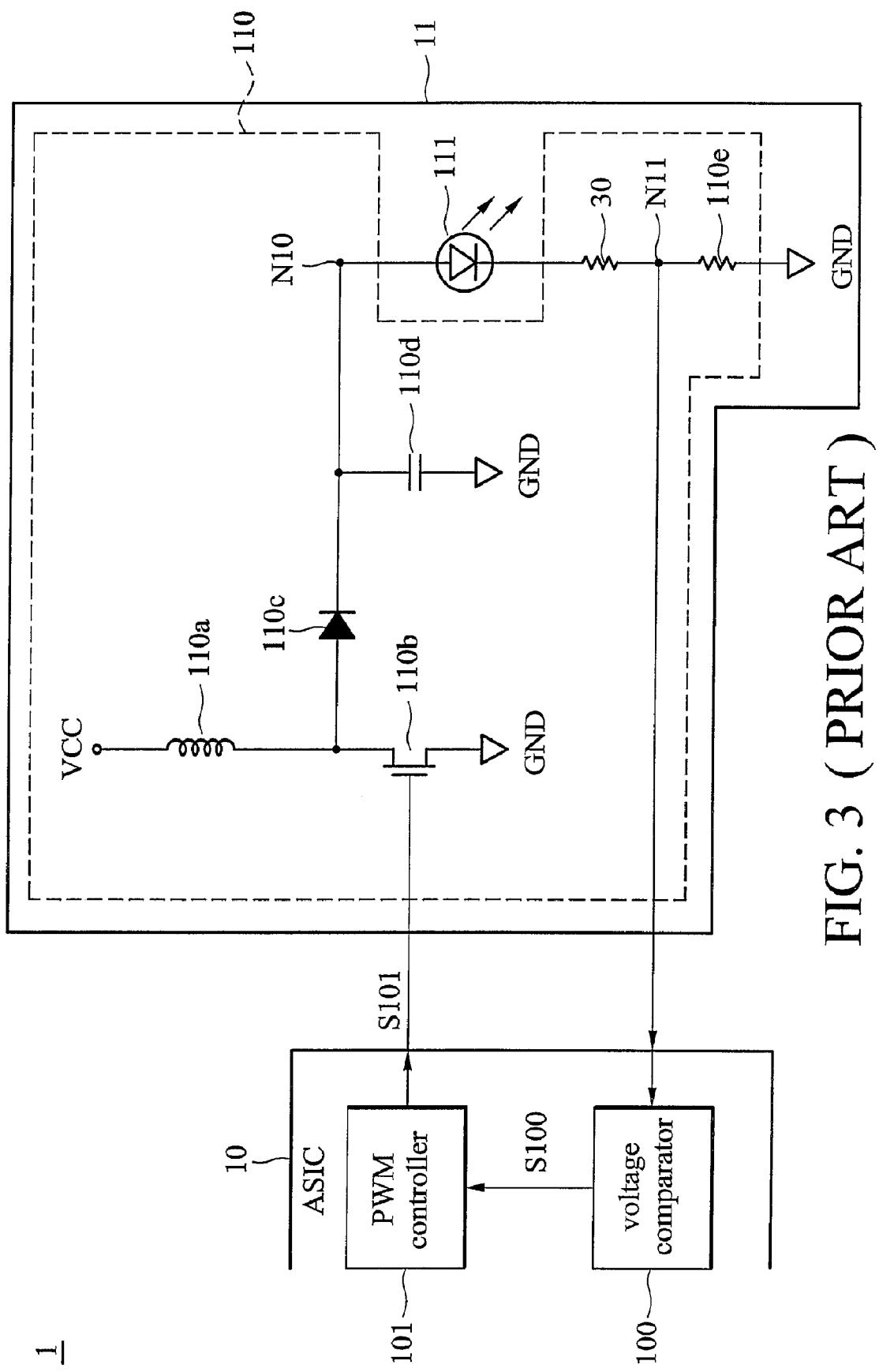
FIG. 3 shows a backlight unit of a conventional display device, wherein the backlight unit uses only one backlight element, and a resistor is coupled serially to the backlight element.
Figure 4:
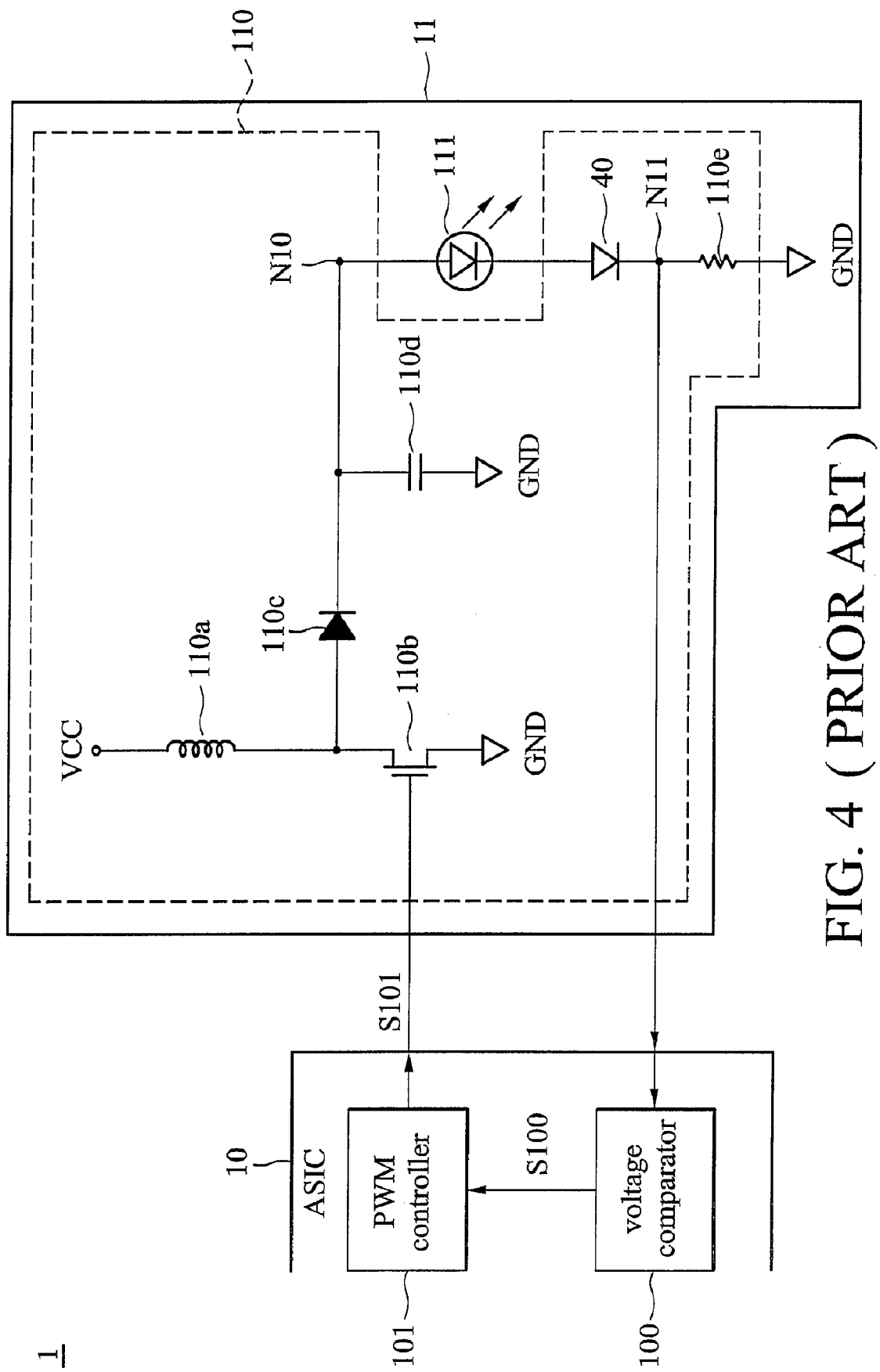
FIG. 4 shows a backlight unit of a conventional display device, wherein the backlight unit uses only one backlight element, and a diode is serially coupled to the backlight element.
Figure 5:
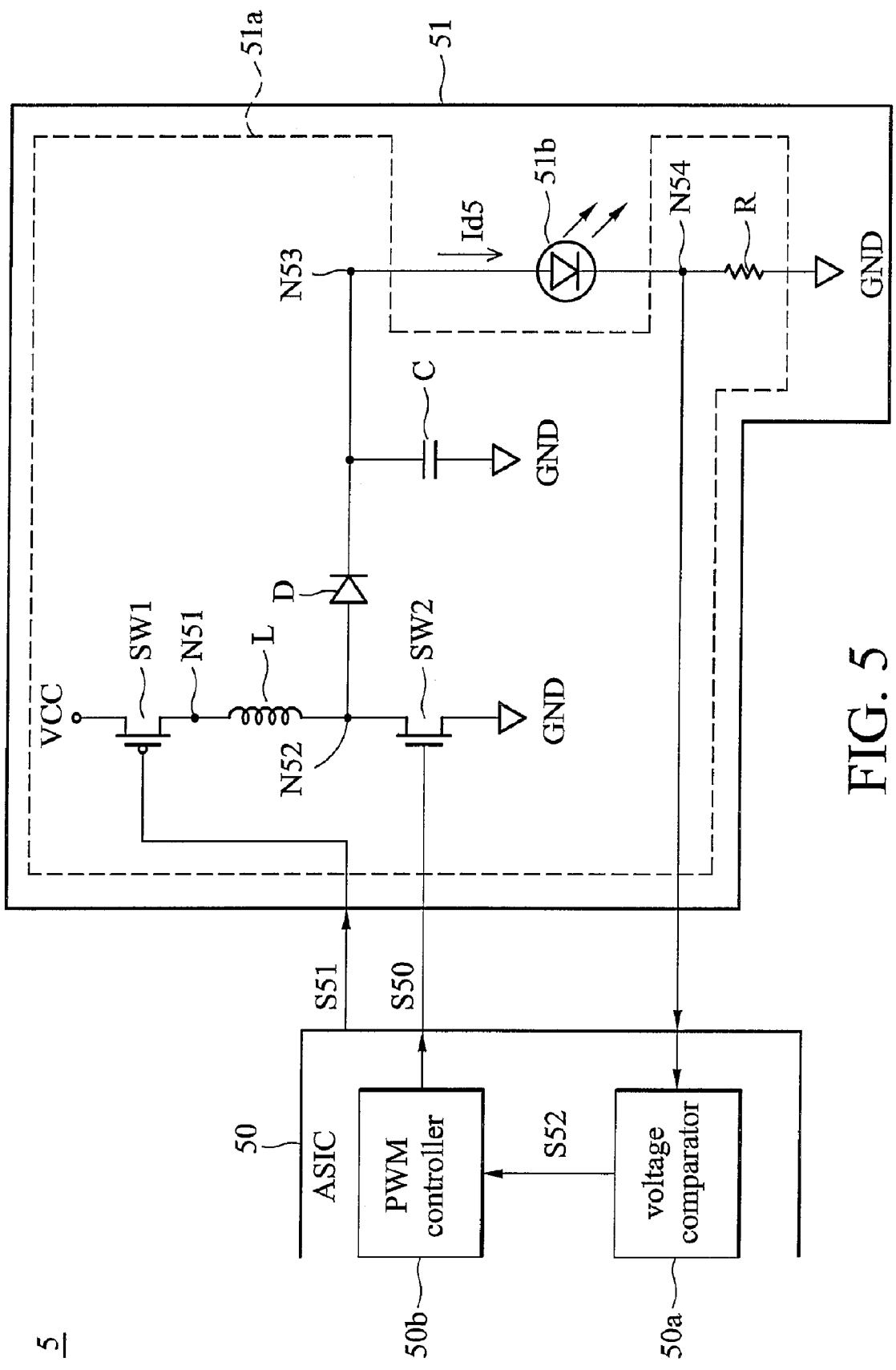
FIG. 5 shows an exemplary embodiment of a display device using only one backlight element.

Display devices are provided. In an exemplary embodiment of a display device as shown in FIG. 5, a display device 5 comprises an application-specific integrated circuit (ASIC) 50 and a backlight unit 51. The ASIC 50 provides a pulse width modulation (PWM) signal S50 and a switch signal S51. The backlight unit 51 can operate in a normal mode or a standby mode and is controlled by the PWM signal S50 and the switch signal S51.

As shown in FIG. 5, the backlight unit 51 comprises a boost circuit 51a and a backlight element 51b. In this embodiment, the backlight element 51b can be implemented by a light-emitting diode (LED). The boost circuit 51a is coupled to a voltage source VCC and controlled by the PWM signal S50 and the switch signal S51. The backlight element 51b is driven by the boost circuit 51a. When the backlight unit 51 operates in the normal mode, the boost circuit 51a is supplied by the voltage source VCC according to the PWM signal S50 and the switch signal S51, so that the boost circuit 51a generates driving current Id5 to drive the backlight element 51b to emit light. When the backlight unit 51 operates in the standby mode, the boost circuit 51a stops being supplied by the voltage source VCC according to the PWM signal S50 and the switch signal S51. The boost circuit 51a is thus no longer able to generate the appropriate driving current Id5, and the backlight element 51b stops emitting light. A detailed description of the operation and circuits of the boost circuit 51a and a backlight element 51b are provided in the following.

As shown in FIG. 5, the ASIC 50 comprises a voltage comparator 50a and a PWM controller 50b. The PWM controller 50b provides the PWM signal S50.

Referring to FIG. 5, the boost circuit 51a comprises first switch SW1, a second switch SW2, an inductor L, a diode D, a capacitor C, and a resistor R. In this embodiment, the first switch SW1 is a PMOS transistor, and the second switch SW2 is an NMOS transistor. A gate (control terminal) of the PMOS transistor SW1 receives the switch signal S51, a source (input terminal) thereof is coupled to the voltage source VCC, and a drain (output terminal) thereof is coupled to a first node N51. The inductor L is coupled between the first node N51 and a second node N52. A gate (control terminal) of the NMOS transistor SW2 receives the PWM signal S50, a drain (input terminal) thereof is coupled to the second node N52, and a source (output terminal) thereof is coupled to a ground GND.

A positive terminal (first terminal) of the diode D is coupled to the second node N52, and a negative terminal (second terminal) thereof is coupled to a third node N53. The capacitor C is coupled between the third node N53 and the ground GND. A first terminal of the resistor R is coupled to a fourth node N54, and a second terminal thereof is coupled to the ground GND. A positive terminal (first terminal) of the backlight element 51b is coupled to the third node N53, and a negative terminal (second terminal) thereof is coupled to the fourth node N54.

When the backlight unit 51 operates in the normal mode, the PWM signal S50 is alternately switched between a low logic state (first logic state) and a high logic state (second logic state), and the switch signal S51 switches to the low logic state to turn on the PMOS transistor SW1. When the PWM signal S50 is in the low logic state, the NMOS transistor SW2 is turned off, the voltage source VCC charges the inductor L. When the PWM signal S50 is in the high logic state, the NMOS transistor SW2 is turned on, a voltage value of the third node N53 is raised according to the stored voltage of the inductor L, and the boost circuit 51a generates the driving current Id5 to drive the backlight element 51b to emit light.

Moreover, when the backlight unit 51 operates in the normal mode, the voltage comparator 50a detects voltage value on the fourth node N54 and compares the voltage value on the fourth node N54 with a reference voltage value. The voltage comparator 50a generates a control signal S52 according to the compared result. The PWM controller 50b is coupled to the voltage comparator 50a and receives the control signal S52. The PWM controller 50b modulates a pulse width of the PWM signal S50 according to the control signal S52. In other words, the PWM controller 50b controls the turn-on state and the turn-off state of the NMOS transistor SW2, and further controls the charging time of the inductor L.

When the backlight unit 51 operates in the standby mode, the PWM signal SW1 switches to the low logic state to turn off the NMOS transistor SW2, and the switch signal S51 switches to the high logic state to turn off the PMOS transistor SW1. The voltage source VCC is not capable of charging the inductor L, and the voltage value of the third node N53 is not raised. The boost circuit 51a is not capable of generating the appropriate driving current Id5, and the backlight element 51b stops emitting light.

As described, the backlight unit 51 with only one backlight element 51b can effectively turn off the backlight element 51b in the standby mode.

Figure 6:
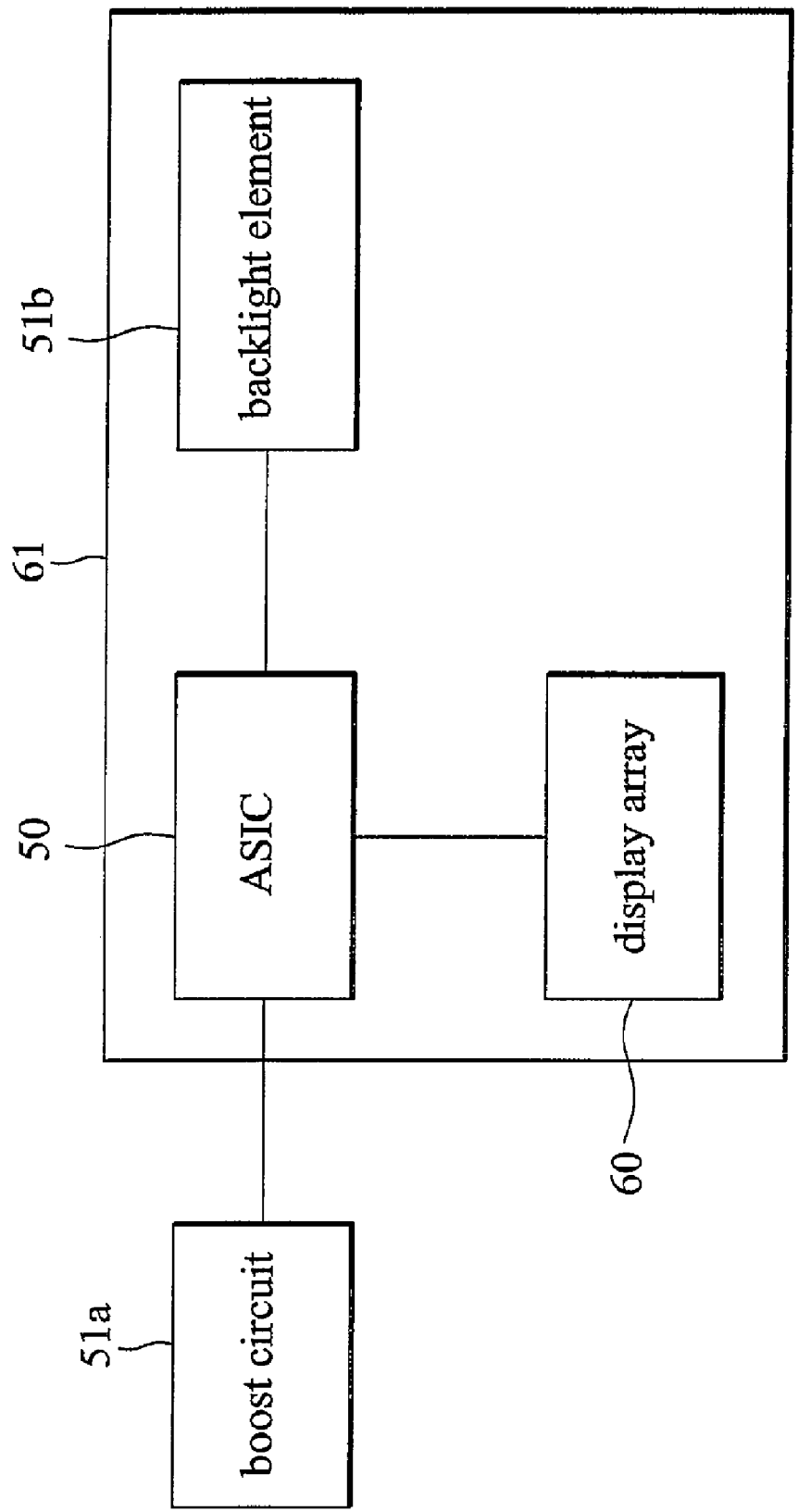
FIG. 6 shows an exemplary embodiment of a display device using only one backlight element.

In some embodiments, the display device 5 further comprises a display array 60, as shown in FIG. 6, and the ASIC 50, the backlight element 51b, and display array 60 are disposed on a display panel 61.

Figure 7:
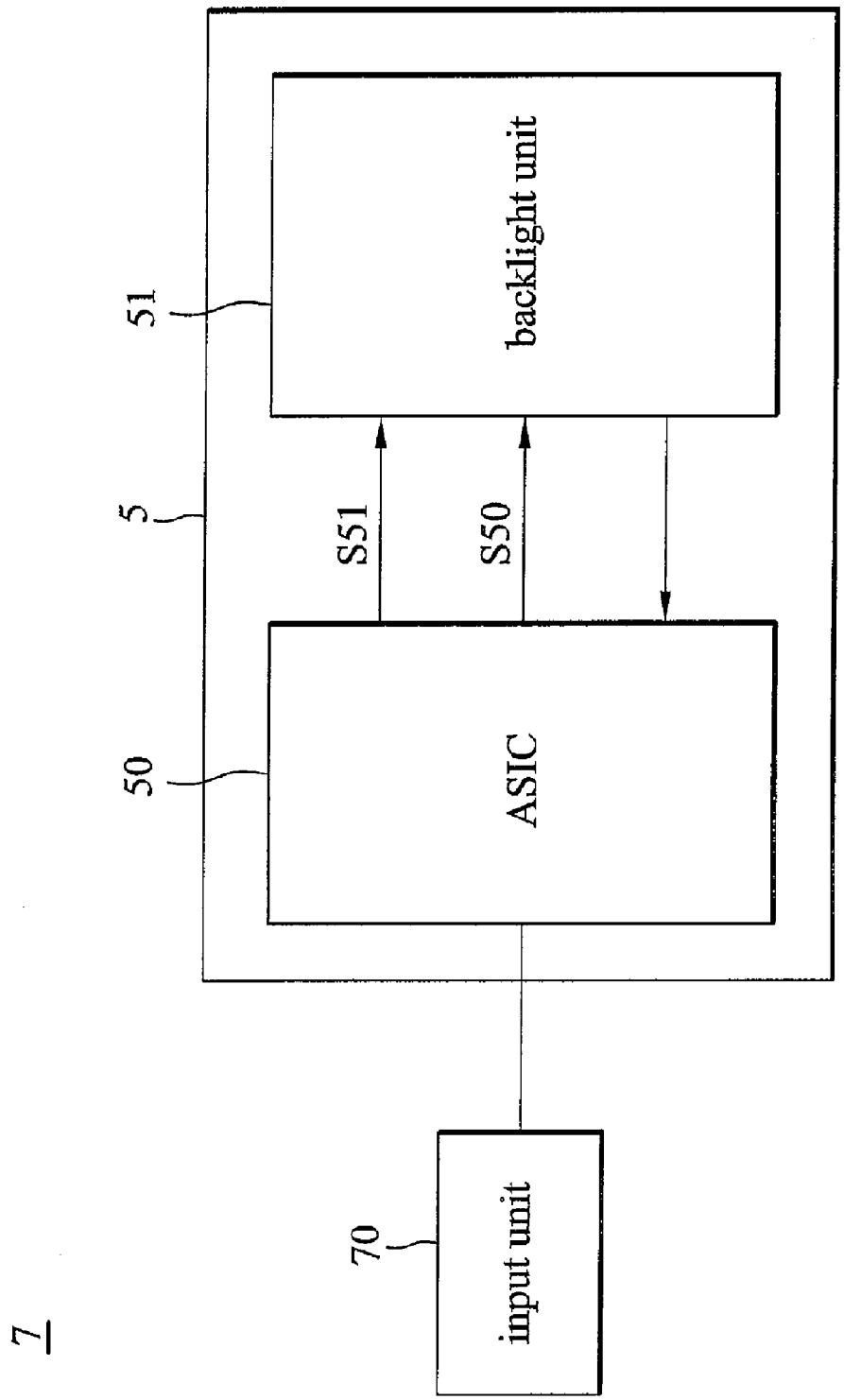
FIG. 7 shows an exemplary embodiment of an electronic system employing the display device disclosed in FIG. 5.

FIG. 7 shows an exemplary embodiment of an electronic system 7 employing the disclosed display device 5. The electronic system 7 may be a portable device such as a PDA, digital camera, notebook computer, tablet computer, cellular phone, a display monitor device, or similar. Generally, the electronic system 7 comprises an input unit 70 and the display device 5 shown in FIG. 5, etc. Further, the input unit 70 is operatively coupled to the display device 5 and provides input signals (e.g., image signal) to the display device 5. The display device 5 drives the backlight element 51b to emit light according to the input signals for displaying images.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A backlight unit in a normal mode or a standby mode, comprising:
   a boost circuit coupled to a voltage source and controlled by a pulse width modulation (PWM) signal and a switch signal; and
   a backlight element driven by the boost circuit;
   wherein, in the normal mode, the boost circuit is supplied by the voltage source according to the PWM signal and the switch signal to drive the backlight element to emit light;
   wherein, in the standby mode, according to the PWM signal and the switch signal, the voltage source stops supplying the boost circuit, and the backlight element stops emitting light; and
   wherein the boost circuit comprises:
   a first switch having a control terminal receiving the switch signal an input terminal coupled to the voltage source, and an output terminal coupled to a first node;
   an inductor coupled between the first node and a second node;
   a second switch having a control terminal receiving the PWM signal, an input terminal coupled to the second node, and an output terminal coupled to a ground;
   a diode having a first terminal coupled to the second node, and a second terminal coupled to a first terminal of the backlight element at a third node; and
   a capacitor coupled between the third node and the ground.

2. The backlight unit as claimed in claim 1, wherein the boost circuit further comprises a resistor having a first terminal coupled to a second terminal of the backlight element at a fourth node, and a second terminal coupled to the ground.

3. The backlight unit as claimed in claim 2, wherein in the normal mode, a pulse width of the PWM signal is modulated according to a voltage value on the fourth node.

4. A display device comprising:
   an application-specific integrated circuit (ASIC) providing a pulse width modulation (PWM) signal and a switch signal; and
   a backlight unit being on a normal mode or a standby mode and controlled by the PWM signal and the switch signal;
   wherein the backlight unit comprises:
      a boost circuit coupled to a voltage source and controlled by the PWM signal and the switch signal; and
      a backlight element driven by the boost circuit;
      wherein, in the normal mode, the boost circuit is supplied by the voltage source according to the PWM signal and the switch signal to drive the backlight element to emit light;
      wherein, in the standby mode, the voltage source stops supplying the boost circuit according to the PWM signal, and the switch signal, and the backlight element stops emitting light; and
      wherein the boost circuit comprises:
      a first switch having a control terminal receiving the switch signal, an input terminal coupled to the voltage source, and an output terminal coupled to a first node;
      an inductor coupled between the first node and a second node;
      a second switch having a control terminal receiving the PWM signal, an input terminal coupled to the second node, and an output terminal coupled to a ground;
      a diode having a first terminal coupled to the second node, and a second terminal coupled to a first terminal of the backlight element at a third node; and
      a capacitor coupled between the third node and the ground.

5. The display device as claimed in claim 4, wherein the boost circuit further comprises a resistor having a first terminal coupled to a second terminal of the backlight element at a fourth node, and a second terminal coupled to the ground.

6. The display device as claimed in claim 5, wherein the ASIC comprises:
   a voltage comparator detecting a voltage value on the fourth node and comparing the voltage value on the fourth node with a reference voltage value in the normal mode, wherein the voltage comparator generates a control signal according compared result; and
   a PWM controller receiving the control signal and modulating a pulse width of the PWM signal according to the control signal in the normal mode.

7. The display device as claimed in claim 4, wherein the ASIC provides the switch signal with a first logic state to turn on the first switch in the normal mode and provides the switch signal with a second logic state to turn off the first switch in the standby mode.

8. An electronic system comprising:
   an input unit providing input signals; and
   a display device coupled to the input unit and displaying images according to the input signals;
   wherein the display device comprises:
      an application-specific integrated circuit (ASIC) providing a pulse width modulation (PWM) signal and a switch signal; and
      a backlight unit in a normal mode or a standby mode controlled by the PWM signal and the switch signal;
      wherein the backlight unit comprises:
         a boost circuit coupled to a voltage source and controlled by the PWM signal and the switch signal; and
         a backlight element driven by the boost circuit;
         wherein, in the normal mode, the boost circuit is supplied by the voltage source according to the PWM signal and the switch signal to drive the backlight element to emit light;
         wherein, in the standby mode, the voltage source stops supplying the boost circuit according to the PWM signal and the switch signal, and the backlight element stops emitting light; and
         wherein the boost circuit comprises:
         a first switch having a control terminal receiving the switch signal, an input terminal coupled to the voltage source; and an output terminal coupled to a first node;
         an inductor coupled between the first node and a second node;
         a second switch having a control terminal receiving the PWM signal, an input terminal coupled to the second node, and an output terminal coupled to a ground;
         a diode having a first terminal coupled to the second node and a second terminal coupled to a first terminal of the backlight element at a third node; and
         a capacitor coupled between the third node and the ground.

9. The electronic system as claimed in claim 8, wherein the boost circuit further comprises a resistor having a first terminal coupled to a second terminal of the backlight element at a fourth node and a second terminal coupled to the ground.

10. The electronic system as claimed in claim 9, wherein the ASIC comprises:
- a voltage comparator detecting a voltage value on the fourth node and comparing the voltage value on the fourth node with a reference voltage value in the normal mode, wherein the voltage comparator generates a control signal according compared result; and
- a PWM controller receiving the control signal and modulating a pulse width of the PWM signal according to the control signal in the normal mode.

11. The electronic system as claimed in claim 8, wherein the ASIC provides the switch signal with a first logic state to turn on the first switch in the normal mode and provides the switch signal with a second logic state to turn off the first switch.

12. The electronic system as claimed in claim 8, wherein the electronic system is a PDA, a digital camera, a display monitor, a notebook computer, a tablet computer, or a mobile phone.

\* \* \* \* \*